(12) United States Patent
Johnsen

(10) Patent No.: US 6,982,506 B1
(45) Date of Patent: Jan. 3, 2006

(54) COOLING OF HIGH SPEED ELECTROMAGNETIC ROTOR WITH FIXED TERMINALS

(75) Inventor: Tyrone A. Johnsen, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 10/930,470

(22) Filed: Aug. 31, 2004

(51) Int. Cl.
*H02K 9/00* (2006.01)

(52) U.S. Cl. .............................. 310/61; 310/58; 310/59; 310/52; 310/270

(58) Field of Classification Search .................. 310/61, 310/58, 59, 52, 270, 54, 57, 60 A, 261, 75 D
See application file for complete search history.

(56) References Cited

U.S. PATENT DOCUMENTS 3,772,543 A * 11/1973 Woodson ..................... 310/52

6,260,667 B1   7/2001 Sugden .......................... 188/68
6,727,609 B2 *  4/2004 Johnsen ......................... 310/52
6,791,230 B2 *  9/2004 Tornquist et al. ............ 310/214

* cited by examiner

*Primary Examiner*—Darren Schuberg
*Assistant Examiner*—Leda Pham
(74) *Attorney, Agent, or Firm*—Carlson, Gaskey & Olds

(57) ABSTRACT

A rotary electric machine assembly includes a stator and a shaft including a hollow core. Mounted onto the shaft is an inner-flanged band with an inner hub, a first flange and a first containment band. An outer-flanged band includes an outer hub that nests over the inner hub and defines a coolant passage therebetween. The outer-flanged band includes a second flange and a second containment band. A rotor core is disposed within a space between the first and second flanges. Coolant flowing through the coolant passage absorbs heat from the rotor core. The rotor core includes windings having end portions. The first and second containment flanges radially support the end portions of the windings.

20 Claims, 4 Drawing Sheets

COOLING OF HIGH SPEED ELECTROMAGNETIC ROTOR WITH FIXED TERMINALS

BACKGROUND OF THE INVENTION

This invention relates generally to a rotary electromagnetic machine. More particularly, this invention relates to cooling of a rotor for an electromagnetic machine.

An electromagnetic machine typically includes a rotor rotated relative to a stator. Such electromagnetic machines convert mechanical energy to electricity or convert electricity to mechanical energy.

Generators typically use a rotor mounted within a stator. The rotor is driven to rotate relative to the stator to create electrical energy. A power generating device that provides increased electrical power output typically utilizes a rotor winding rather than a permanent magnet-type electric generator. The rotor winding becomes an electromagnet when the winding is connected to a current source. An electromagnet produces a rotating magnetic field of sufficient intensity to generate the desired amount of electrical power. The rotor winding generally comprises a plurality of coils wound around a magnetic core.

Generators produce heat through resistance loss in the rotor and stator winding, eddy currents within the stator and rotor cores, and friction between bearings and the fluid between the rotating and stationary components. The rotor and stator are typically cooled by a coolant fluid such as oil or a cool gas. Heat generated and produced by a generator reduces efficiency and limits generator output.

Increasing the electrical power output from a generator is typically accomplished by increasing the diameter or length of the rotor, or by increasing rotor speed. However, as the diameter, length and speed of the rotor is increased, the heat generation caused by electrical resistance and other mechanical interactions increases.

It is known to cool a rotor by flowing coolant through a hollow shaft into a magnetic core. Fluid within the magnetic core is then dispersed and driven radially outward by the centrifugal force generated by rotation of the rotor. Disadvantageously, as the rotor core increases in size to provide increased power generation, the cooling efficiency of conventional coolant passages is not sufficient to provide a desired cooling level.

Increasing rotor speed creates the additional challenge of supporting and containing electrical windings that are disposed toward ends of the rotor core. Forces caused by rotor rotation push the end windings radially outward. Typically, a continuous band of high-strength material is provided over the end turns at each end of the electromagnetic winding to contain the movement of the winding end turns. An additional method used on higher speed rotors is the inclusion of a continuous sleeve over the core and both the winding end turns. The sleeve is also of a high-strength material, such as a continuous wound fiber composite or super high-strength material, and it is provided to support and contain the core and the end windings. The addition of the sleeve over the core can result in an undesirable increase in the magnetic air gap between the rotor and the stator that can have adverse affects on power generation.

Accordingly, it is desirable to develop and design a generator having coolant passages that cool a rotor core more efficiently to accommodate increased power generation and rotors of increased size.

SUMMARY OF THE INVENTION

An example disclosed rotary electric machine for generation of power includes a shaft having a hollow core that rotates relative to a stator. Disposed on the shaft is an inner-flanged band that includes an inner hub, a first flange and a first containment band. An outer-flanged band includes an outer hub disposed on the inner hub and includes a second flange and a second containment band. Between the first and second flanges is defined a space for a rotor core. A space between the inner and outer hub defines a coolant passage through which coolant is passed for cooling the adjacent rotor. The first and second containment bands radially support end portions of rotor windings.

The example rotary electric machine includes the shaft with the hollow core and includes at least one passage disposed radially and in communication with a passage defined between the inner hub and the outer hub. The passage through the shaft aligns with a passage in the inner hub. The inner hub in turn communicates coolant to a passage defined between the inner hub and the outer hub. The inner hub includes the first flange and the outer hub includes the second flange. The rotor is disposed between the first and second flanges. The passage defined between the inner hub and the outer hub is disposed adjacent this rotor core. Coolant flowing from the hollow shaft into the coolant passage accepts heat from the rotor core and moves axially towards openings disposed near the ends of each of the inner and outer hubs. Coolant exits openings near these open ends and is sprayed radially outward by the centrifugal force of the rotating rotor onto the end portions of the windings of the rotor. The end portions of the windings are radially supported by the first and second containment bands. The coolant absorbs additional heat from the end windings and is further driven outwardly where the coolant is recovered and recycled for reuse.

Accordingly, the generator assembly of this invention includes flanged bands the provide coolant features and support for windings providing for increased power generation without substantial increases in heat generation.

These and other features of the present invention can be best understood from the following specification and drawings, the following of which is a brief description.

DETAILED DESCRIPTION OF THE PREFERRED EMBODIMENT

Figure 1:
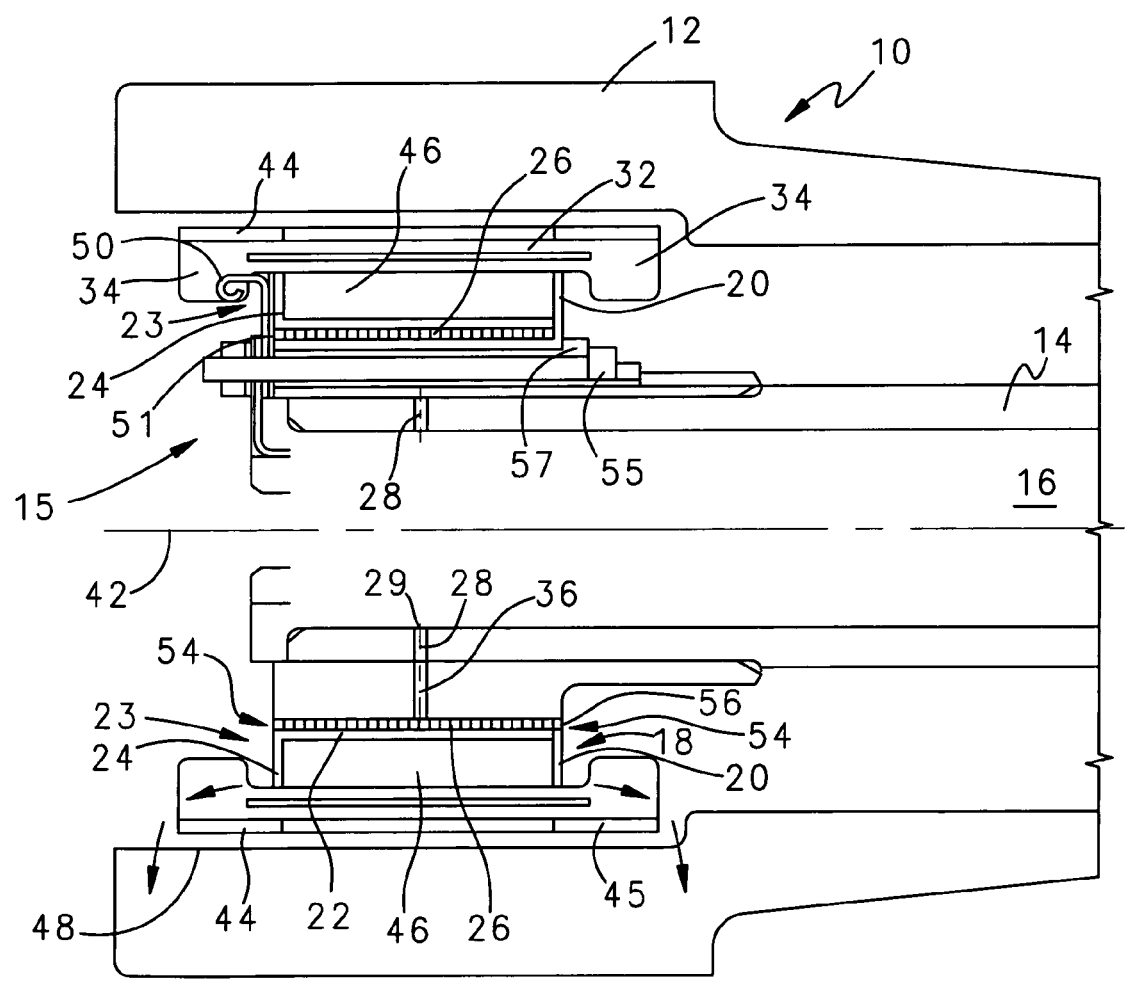
FIG. 1 is a cross-sectional view of a rotary electric machine according to this invention.
Figure 2:
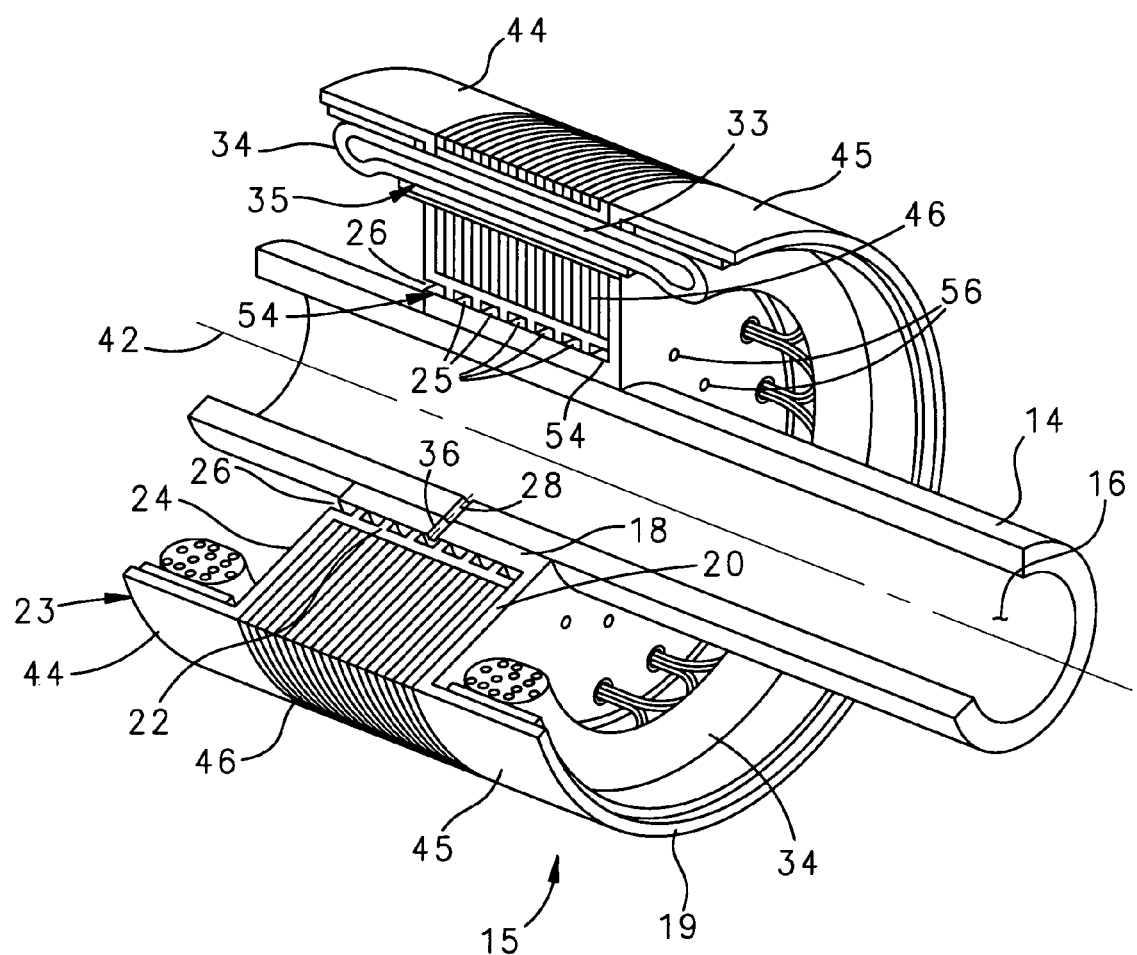
FIG. 2 is a partial sectional view of a rotor assembly according to this invention.

Referring to FIGS. 1 and 2, a generator assembly 10 includes a shaft 14 that rotates about an axis 42. The shaft 14 includes a hollow core 16. Through the hollow core 16, coolant is provided and communicated through opening 28. An inner flanged band 19 is mounted on the shaft 14. The inner flanged band 19 includes an inner hub 18, a first flange 20 and a containment band 45. The first flange 20 extends perpendicularly from the inner hub 18 and relative to the axis 42. The containment band 45 extends perpendicularly from the first flange 20 parallel with the axis 42. Nested on and disposed on top of the inner flanged band 19 is an outer flanged band 23. The outer-flanged band 23 includes an outer hub 22, a second flange 24 and a second containment band 44. The first flange 20 and the second flange 24 define an axial space therebetween. The axial space between the first flange 20 and second flange 24 is of such a length to provide the space required for a rotor core 46. The rotor core 46 preferably comprises a rotor stack as is known to a worker skilled in the art.

The rotor core 46 is one portion of the rotor assembly 15. The rotor assembly 15 includes the rotor core 46 and windings 32 along with the structures. The windings 32 include end portions 34 at each axial end. The end portions 34 extend through slots 35 provided within the flanged bands 19,23 and are suspended axially outward from each of the first flange 20 and the second flange 24. Disposed about each of the end portions 34 of the windings 32 are the first and second containment bands 45, 44. The first and second containment bands 45, 44 provide strength and rigidity that substantially prevent centrifugal forces from driving the end portions 34 radially outward. The first containment band 44 is part of the inner-flanged band 19 and the second containment band is part of the outer-flanged band 23. The first and second containment bands 44, 45 extend parallel to the axis 42 in opposing directions. The inclusion of the containment bands 44, 45 eliminates the need for an additional element to support and protect the end portions of the windings 32.

Rotation of the shaft 14 results in rotation of the rotor assembly 15. The rotor assembly 15 rotates relative to a stator assembly 12. The relative rotation between the rotor assembly 15 and the stator assembly 12 is as known to a worker skilled in the art and provides for the generation and conversion of mechanical energy into electrical energy.

The generator assembly 10 shown and described is directed towards an electrical generator that converts mechanical energy to electrical energy, it is also within the contemplation of this invention that the configuration be used for an electric motor that converts electrical energy to mechanical energy. Further, a machine that drives the generator assembly 10 of this invention can include propulsion systems or auxiliary propulsion units. As appreciated, any drive device as known to a worker in the art is within the contemplation of this invention to drive the generator assembly 10.

The rotor core 46 generates heat caused by resistance and frictional contact as known. Coolant flowing through the passage 26 defined between the inner hub 18 and the outer hub 22 absorbs the heat. Coolant flows from the hollow inner core 16 of the shaft 14 and then through openings 28. The openings 28 include an orifice 29. The orifice 29 provides for the regulation of coolant flow from the hollow core 16 into the passage 26. Preferably, there is a plurality of openings 28 all including similar orifices 29.

The openings 28 align with openings 36 within the inner hub 18. The openings 28 may have elongated holes to provide for the communication with the opening 36 within the inner hub 18. Coolant within the passage 26 flows axially adjacent the outer hub 22 towards the axial ends 54. The passage 26 includes a plurality of heat transfer elements 25. The heat transfer elements 25 include a series of ridges or pins that provide for the circulation of coolant about the circumference of the rotor assembly 15. The heat transfer elements 25 provide a desirable increase in the capability of coolant within the passage 26 to absorb heat rejected from the core 46 and winding 32. The heat transfer elements 25 illustrated are disposed on the outer flanged band 23, however, the heat transfer elements 25 may be formed on the inner flanged band 19 or formed partially on both the inner and outer flanged bands 19,23. Although, the heat transfer elements 25 are shown and described as a plurality of circumferentially disposed ridges, a worker with the benefit of this disclosure would understand that any heat transfer structure is within the contemplation of this invention.

Each of the axial ends 54 provides for the exit flow of coolant axially and then radially outward. The inner hub 18 includes openings 56 adjacent the first flange 20. The openings 56 provide and allow coolant to escape just as it does the opposite distal end 54. Because the first flange 20 is disposed at this axial end, the opening 56 provides for escape of coolant from the coolant passage 26.

The second flange 24 extends from the outer hub 22 that is disposed on top of the inner hub 18. The space between the inner and outer hubs 18, 22 provides the openings that are required to allow coolant to flow and escape the passage 26. Once coolant has escaped the passage 26, it is thrown outward radially by the centrifugal force generated by rotation of the rotor assembly 15. This coolant bathes end windings 34. Bathing of the end portions 34 with coolant provides a cooling effect that is beneficial to the life and efficiency of the generator assembly 10.

The coolant passage 26 is disposed as close as possible to the rotor core 46. It is desirable to position the coolant passage 26 as close to the rotor core 46 as possible. The nearer the coolant within the coolant passage 26 is to the rotor core 46, the lower the thermal resistive path and the greater amount of heat that can be absorbed and removed.

Figure 3:
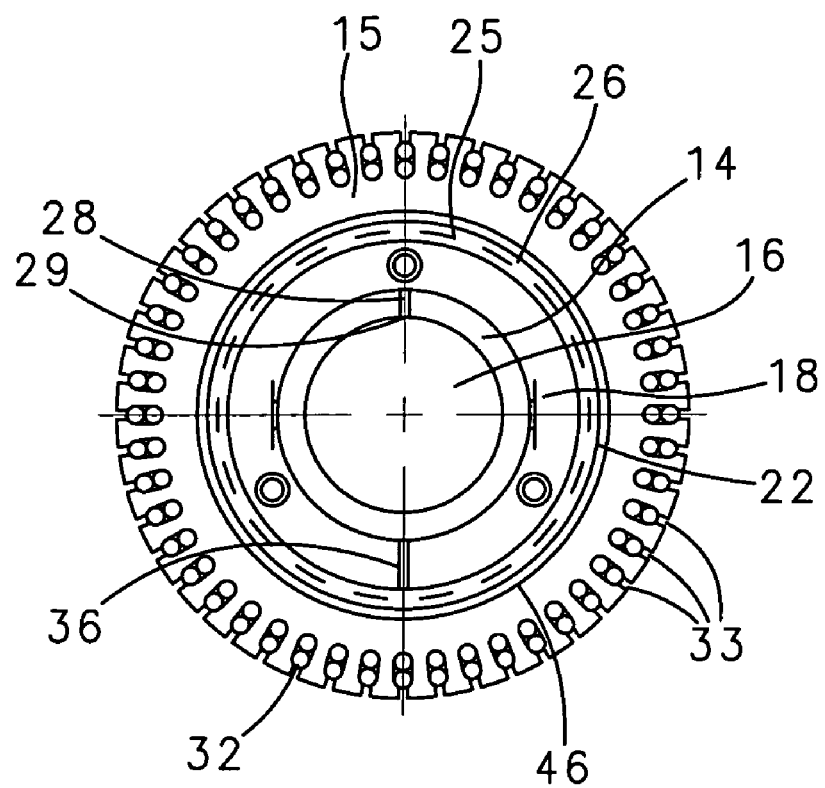
FIG. 3 is a sectional view through a mid-section of the rotor according to this invention.

Referring to FIG. 3, a cross-section perpendicular to the axis 42 is shown and illustrates windings 32 disposed within slots 33 of the rotor core 46. The windings 32 extend through the slots 33 of the rotor core 46 and out the slots 35 of the inner and outer-flanged bands 19,23 about the circumference of the rotor assembly 15 (FIG. 2). The windings 32 are disposed about the circumference of the rotor assembly 15 to provide for the production of a desired amount of electrical energy. The coolant passage 26 comprises a circumferential passage and coolant flows through the passage 36 in the inner hub 18 into the coolant passage 26.

Coolant within the coolant passage 26 flows about the entire circumference and adjacent the rotor core 46. Additionally, the coolant passage 26 includes the heat transfer elements 25 to direct and distribute coolant to all portions of the inner hub 18. Direction of the coolant is provided to maximize heat absorption capacity of coolant within the coolant passage 26. Further, the heat transfer elements 25 distribute coolant to all portions adjacent the rotor core 46 such that the absorption and temperature of the rotor core 46 is consistent throughout.

Figure 4:
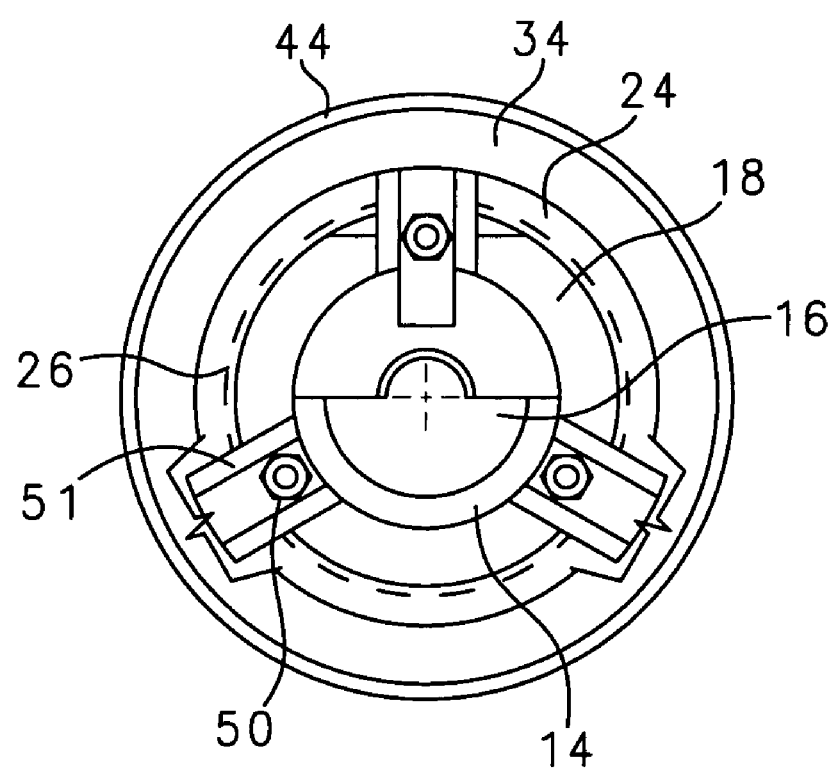
FIG. 4 is an end view of the rotor assembly according to this invention.

Referring to FIG. 4, a front view of the generator assembly 10 is shown illustrating terminals 50. The terminals 50 are for a typical three-phase winding as is known to a worker versed in the art. Although a typical three-phase winding is shown, it is within the contemplation of this invention to use and apply this invention to single and multi-phase windings.

The electrical wire of the winding is shown mated directly with the formed electrical terminal 50 that is secured to the flange 24 of the outer-flanged band 23 and the hub 18 of the inner-flanged band 19. The terminal 50 is provided with an insulating material 51 to insulate the terminal 50 from the inner and outer flanged bands 23 and 19. Mounting of the terminals 50 to the flanged bands 23 or 19 reduces the affect that centrifugal forces have on the terminals 50 and the joint betweend the winding 32 and the terminal 50. In the example approach shown the terminals also include a threaded stud fastener 55 mounted in the inner-flanged band 19 and electrically isolated by insulator 57. Other methods of fastening the connecting electrical leads are known.

Referring to FIGS. 1 and 2, the first and second flanges 20,24 to the inner and outer hubs 18,22 stiffens and strengthens the first and second containment bands 44, 45 with minimal thickness required of the band portions 44,45 to restrain relative movement between rotor assembly 15 elements. Further, separately installed containment bands can shift or become displaced from a desired position. Movement of the containment band relative to the rotor assembly 15 can create an undesirable unbalanced condition. Because the first and second containment bands 44, 45 are an integral feature of the inner and outer-flanged bands 19,23, the potential for relative movement is substantially eliminated. This provides for the potential improvement of the functional capability of the first and second containment flanges 44, 45 that in turn provides for higher rotor speeds and the use of lighter structural materials. The extension of the first and second flanges 20, 24 from the inner and outer hubs 18,22 maintains the first and second containment flanges 44, 45 concentrically with the rotor core 46 during rotation. The first and second flanges 20, 24 strengthen the containment band 44 at distal ends of the rotor core 46 such that the end portions 34 on the rotor core 46 maintain a desired radial position.

In operation of the generator assembly 10, coolant flows through the hollow portion of the shaft 14 to the openings 28. The orifices 29 within the openings 28 regulate the flow of coolant to the passages 26. The opening 28 communicate with passages 36 within the inner hub 18. The inner hub 18 includes the first flange 20 that extends upwardly, and the first containment band 44 that extend outward from the first flange 20 to support the end portions 34 of the windings 32. The outer hub 22 nests on top of the inner hub 18 and defines the coolant passage 26. Coolant passage 26 is adjacent the rotor core 46 such that heat generated in the rotor core 46 is dissipated and absorbed by coolant within the coolant passage 26. As coolant within the coolant passage 26 moves axially outward toward the ends 54 and opening 56, heat is absorbed and moved away from the rotor core 46. Coolant exiting the end 54 and the openings 56 washes over the end portions 34, absorbing additional heat and is eventually driven outward to the stator assembly 12.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A rotary electric machine assembly comprising:
   a stator;
   a shaft including a hollow core;
   an inner flanged band including an inner hub supported on said shaft, a first flange and a first containment band;
   an outer-flanged band supported on said inner-flanged band including an outer hub, a second flange and a second containment band;
   a coolant passage defined between said inner hub and said outer hub; and
   a rotor supported on said outer hub between said first and second flanges, said rotor including end portions of windings supported by said first containment band and said second containment band.

2. The assembly as recited in claim 1, wherein said shaft includes an opening communicating coolant from said hollow core to said coolant passage.

3. The assembly as recited in claim 1, wherein said coolant passage is disposed substantially parallel to said shaft.

4. The assembly as recited in claim 1, wherein said first and second containment bands extend axially outward in opposing directions.

5. The assembly as recited in claim 1, wherein said coolant passage includes openings near each end portion of said windings.

6. The assembly as recited in claim 5, wherein said first flange includes an opening for coolant near one of said end portions of said windings.

7. The assembly as recited in claim 1, wherein said coolant passage communicates coolant circumferentially about said inner hub.

8. The assembly as recited in claim 1, wherein said coolant passage communicates coolant adjacent said rotor.

9. The assembly as recited in claim 1, wherein said outer hub is supported on said inner hub such that said second flange is disposed opposite said first flange.

10. The assembly as recited in claim 1, wherein said coolant passage includes heat transfer elements for distributing coolant flow adjacent said inner hub.

11. The assembly as recited in claim 1, including a terminal attached to said inner-flanged band.

12. The assembly as recited in claim 11, wherein said terminal is electrically insulated from said inner hub.

13. A rotor assembly for an electric machine comprising:
    a shaft including a hollow core;
    an inner-flanged band including an inner hub supported on said shaft, a first flange transverse to said inner hub and a first containment band extending from said first flange;
    an outer flanged band including an outer hub supported on said inner hub, a second flange transverse to said outer hub and a second containment band extending from said second flange; and
    a coolant passage defined between said inner hub and said outer hub for coolant.

14. The assembly as recited in claim 13, wherein said shaft includes an opening communicating coolant from said hollow core to said coolant passage.

15. The assembly as recited in claim 13, including windings having end portions, wherein said first and second containment bands radially support said end portions of said windings.

16. The assembly as recited in claim 15, wherein said first containment band extends transversely from said first flange and said second containment band extends transversely in a direction opposing said first containment band from said second flange.

17. The assembly as recited in claim 13, wherein said coolant passage includes openings near each of said end portions of said windings.

18. The assembly as recited in claim 13, wherein said first flange includes an opening for coolant near one of said end portions of said windings.

19. The assembly as recited in claim 13, wherein said passage includes heat transfer elements for distributing coolant flow about a circumference of said inner hub.

20. The assembly as recited in claim 13, including a terminal attached to said inner hub.

\* \* \* \* \*